(12) United States Patent
Yang et al.

(10) Patent No.: US 10,161,384 B1
(45) Date of Patent: Dec. 25, 2018

(54) FAN CONTROL CIRCUIT AND FAN CONTROL METHOD

(71) Applicant: ANPEC ELECTRONICS CORPORATION, Hsinchu (TW)

(72) Inventors: Chia-Tai Yang, Tainan (TW); Yin-Kai Chen, Hsinchu (TW); Ching-Feng Lai, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/725,359

(22) Filed: Oct. 5, 2017

(30) Foreign Application Priority Data

Jul. 26, 2017 (TW) .............................. 106125120 A

(51) Int. Cl.
- *H02P 1/00* (2006.01)
- *H02P 3/00* (2006.01)
- *H02P 5/00* (2016.01)
- *F03D 7/02* (2006.01)
- *F03D 7/04* (2006.01)

(52) U.S. Cl.
CPC ........... *F03D 7/0276* (2013.01); *F03D 7/042* (2013.01)

(58) Field of Classification Search
CPC ............................... F03D 7/0276; F03D 7/042
USPC ............................................................ 318/268
See application file for complete search history.

(56) References Cited

U.S. PATENT DOCUMENTS

| | | | |
|---|---|---|---|
| 2006/0142901 A1* | 6/2006 | Frankel | H05K 7/20209 700/300 |
| 2010/0109730 A1* | 5/2010 | Zhang | H02M 3/156 327/175 |
| 2010/0164581 A1* | 7/2010 | Zhang | H02P 6/085 327/175 |

FOREIGN PATENT DOCUMENTS

TW          201228212 A1      7/2012

* cited by examiner

*Primary Examiner* — Erick Glass
(74) *Attorney, Agent, or Firm* — Li & Cai Intellectual Property (USA) Office

(57) ABSTRACT

A fan control circuit for controlling a fan includes a processing module, a driving module and a speed compensation module. The driving module is electrically connected to the processing module, and generates at least one driving signal to drive the fan. The speed compensation module is electrically connected to the processing module, and receives a first voltage. The first voltage is variable. The speed compensation module generates and transmits a speed-compensation parameter to the processing module according to the first voltage and a first waveform, and the processing module adjusts the driving signal according to the speed-compensation parameter.

12 Claims, 2 Drawing Sheets

FAN CONTROL CIRCUIT AND FAN CONTROL METHOD

BACKGROUND OF THE INVENTION

1. Field of the Invention

The present disclosure relates to a fan control circuit and a fan control method; in particular, to a fan control circuit and a fan control method that can stabilize the heat dissipating efficiency of a fan.

2. Description of Related Art

Generally, in a fan control circuit, the voltage for adjusting the rotation speed of a fan decreases with a decrease of the system power supply. When the voltage for adjusting the rotation speed of a fan decreases, the rotation speed of the fan decreases. Once the rotation speed of the fan cannot maintain at a predetermine speed and the rotation speed of the fan drops, the heat dissipating efficiency of the fan will decrease because there are less air flows.

Thus, it is necessary to develop a fan control circuit and a fan control method that can stabilize the heat dissipating efficiency of a fan.

SUMMARY OF THE INVENTION

The present disclosure provides a fan control circuit for controlling a fan. This fan control circuit includes a processing module, a driving module and a speed compensation module. The driving module is electrically connected to the processing module, and generates at least one driving signal to drive the fan. The speed compensation module is electrically connected to the processing module, and receives a first voltage. The first voltage is variable. The speed compensation module generates and transmits a speed-compensation parameter to the processing module according to the first voltage and a first waveform, and the processing module adjusts the driving signal according to the speed-compensation parameter.

The present disclosure also provides a fan control method for compensating the rotation speed of a fan. This fan control method includes: generating a speed-compensation voltage according to a first voltage, wherein the first voltage is variable; generating a speed-compensation parameter according to the speed-compensation voltage and a first waveform; and adjusting the rotation speed of the fan according to the speed-compensation parameter.

To sum up, in the fan control circuit and the fan control method provided by the present disclosure, the input voltage is variable and the speed-compensation voltage is generated according to the input voltage. In this manner, the decrease of the rotation speed of the fan, resulted from the float input voltage, can be avoided, and thus the heat dissipating efficiency of the fan can be improved and the manufacturing cost can also be reduced.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

There is at least one embodiment illustrated with corresponding figures for describing the fan control circuit and the fan control method in the present disclosure, but it is not for restricting the present disclosure.

[One Embodiment of the Fan Control Circuit]

Figure 1:
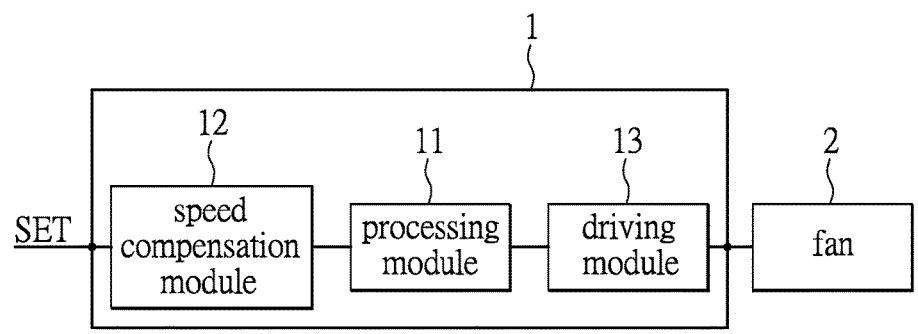
FIG. 1 shows a schematic diagram of a fan control circuit according to one embodiment of the present disclosure.
Figure 2:
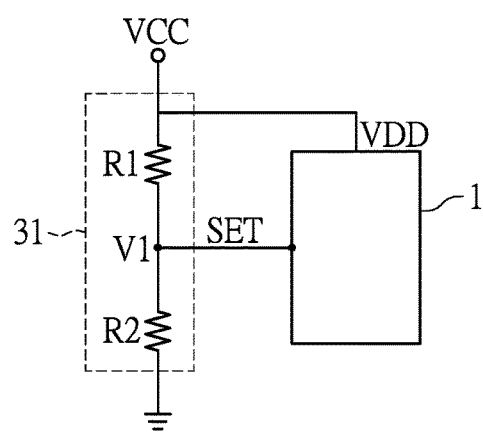
FIG. 2 shows a schematic diagram of a fan control circuit according to another embodiment of the present disclosure.

Referring to FIG. 1 and FIG. 2, FIG. 1 is a schematic diagram of a fan control circuit according to one embodiment of the present disclosure, and FIG. 2 is a schematic diagram of a fan control circuit according to another embodiment of the present disclosure.

As shown in FIG. 1, the fan control circuit 1 includes a processing module 11, a speed compensation module 12 and a driving module 13. The fan control circuit 1 drives a fan 2. The processing module 11 is electrically connected to the speed compensation module 12 and the driving module 13. The fan control circuit 1 further includes a duty-cycle determination module (not shown). The duty-cycle determination module is electrically connected to the processing module 11, and receives a speed control signal from a system circuit (not shown). The speed control signal is a pulse width modulation signal. The processing module 11 receives the speed control signal from the duty-cycle determination module, and then generates and transmits at least one control signal to the driving module 13.

The driving module 13 generates at least one driving signal to drive the fan 2 according to the control signal from the processing module 11. The driving module 13 is electrically connected to the fan 2. In this embodiment, the driving module 13 is an H-bridge driving circuit, which is a driving circuit of which the circuit configuration basically includes two sets of switches as upper switches and lower switches. In other embodiments, the driving module 13 can be other kinds of driving circuits, and it is not limited thereto.

As shown in FIG. 2, the fan control circuit 1 has a power pin VDD and a set pin SET. The power pin VDD is electrically connected to a first voltage VCC. The first voltage VCC is provided by the system circuit (not shown). The first voltage VCC may decrease according to different conditions of the load, so the first voltage VCC is variable. In addition, the speed compensation module 12 is electrically connected to the set pin SET.

The fan control circuit 1 further includes a voltage divider 31. The voltage divider 31 includes a first resistor R1 and a second resistor R2. The first end of the first resistor R1 is coupled to the first voltage VCC, and the second end of the first resistor R1 is electrically connected to the first end of the second resistor R2 and the set pin SET. The second end of the second resistor R2 is coupled to a grounding voltage. The voltage divider 31 receives the first voltage VCC, and accordingly generates a speed-compensation voltage V1. Then, the speed-compensation voltage V1 is transmitted to the set pin SET for the following proceeding.

It should be noted that, the circuit configuration of the voltage divider 31 is not restricted. In addition, in the fan control circuit 1, the resistance of the first resistor R1 can be constant, and only the resistance of the second resistor R2 is adjusted for dividing voltage. Alternatively, in the fan control circuit 1, the resistance of the second resistor R2 can be constant, and only the resistance of the first resistor R1 is adjusted for dividing voltage.

Figure 3:
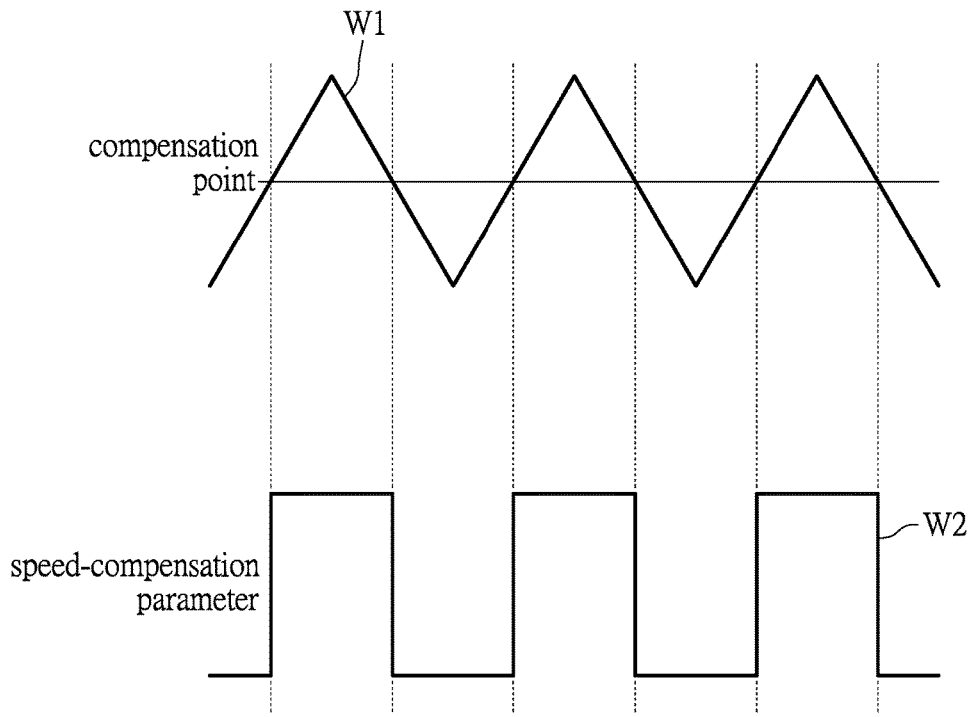
FIG. 3 is a schematic diagram showing the first waveform, the compensation point and the speed-compensation parameter according to one embodiment of the present disclosure.

In other embodiments, the set pin SET is electrically connected to an analog to digital converter (not shown) to convert the voltage at the set pin SET into a digital voltage signal, and this digital voltage signal is transmitted to the processing module 11 as a reference for adjusting the driving signal. In short, the analog to digital converter generates and transmits a signal to the processing module 11 for speed compensation. In this embodiment, the speed compensation module 12 is an analog to digital converter, and this analog to digital converter is configured in the motor control circuit. Referring to FIG. 3, FIG. 3 is a schematic diagram showing the first waveform, the compensation point and the speed-compensation parameter according to one embodiment of the present disclosure.

The speed compensation module 12 receives a speed-compensation voltage from the set pin SET of the fan control circuit 1, and generates a speed-compensation parameter according to the speed-compensation voltage and a first waveform W1. A pulse width modulation signal is generated according to the intersection of the first waveform W1 and the speed-compensation voltage, and this pulse width modulation signal is a speed-compensation parameter W2. According to the speed-compensation parameter, the processing module 11 adjusts the control signal, which is transmitted to the driving module 13 for driving the fan 2.

Although the speed-compensation voltage in FIG. 3 is predetermined, the first voltage VCC is variable as described above, so in other embodiments, the speed-compensation voltage can be variable. When the speed-compensation voltage is variable, the speed-compensation voltage can be adjusted (being increased or being decreased) according to the first voltage VCC. As a result, the speed-compensation parameter has different duty cycles. In this embodiment, the first waveform W1 is a triangle wave, but in other embodiments, the first waveform W1 can be other kinds of waves, such as a sawtooth wave.

Figure 4:
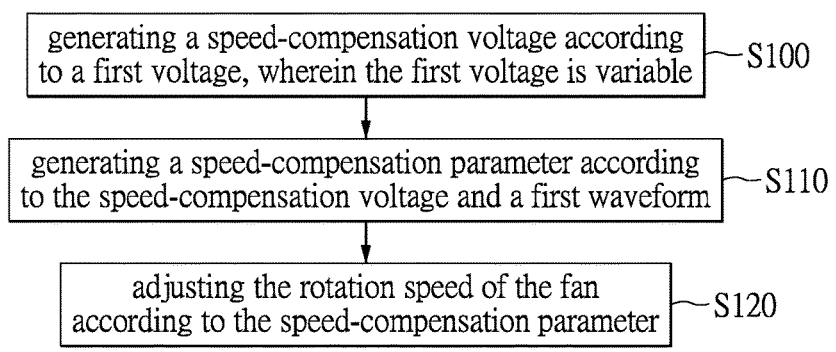
FIG. 4 shows a flow chart of a fan control method according to one embodiment of the present disclosure.

Referring to FIG. 4, a flow chart of a fan control method according to one embodiment of the present disclosure is shown.

A fan control method provided by the present disclosure is adapted to the fan control circuit illustrated in the above embodiment, and thus details about the fan control circuit are not repeated herein. This fan control method is for stabilizing the rotation speed of a fan, and includes steps as follows: generating a speed-compensation voltage according to a first voltage, wherein the first voltage is variable (step S100); generating a speed-compensation parameter according to the speed-compensation voltage and a first waveform (step S110); and adjusting the rotation speed of the fan according to the speed-compensation parameter (step S120).

In step S100, the fan control circuit 1 has a power pin VDD and a set pin SET. The power pin VDD is electrically connected to a first voltage VCC. The first voltage VCC is provided by the system circuit (not shown). The first voltage VCC may decrease according to different conditions of the load, so the first voltage VCC is variable. In addition, the speed compensation module 12 is electrically connected to the set pin SET. The fan control circuit 1 further includes a voltage divider 31. The voltage divider 31 includes a first resistor R1 and a second resistor R2. The first end of the first resistor R1 is coupled to the first voltage VCC, and the second end of the first resistor R1 is electrically connected to the first end of the second resistor R2 and the set pin SET. The second end of the second resistor R2 is coupled to a grounding voltage. The voltage divider 31 receives the first voltage VCC, and accordingly generates a speed-compensation voltage V1. Then, the speed-compensation voltage V1 is transmitted to the set pin SET for the following proceeding.

It should be noted that, the circuit configuration of the voltage divider 31 is not restricted. In addition, in the fan control circuit 1, the resistance of the first resistor R1 is constant, and only the resistance of the second resistor R2 can be adjusted for dividing voltage. Alternatively, in the fan control circuit 1, the resistance of the second resistor R2 is constant, and only the resistance of the first resistor R1 can be adjusted for dividing voltage.

In other embodiments, the set pin SET is electrically connected to an analog to digital converter (not shown) to convert the voltage at the set pin SET into a digital voltage signal, and this voltage digital signal is transmitted to the processing module 11 as a reference for adjusting the driving signal. In short, the analog to digital converter generates and transmits a signal to the processing module 11 for speed compensation. In this embodiment, the speed compensation module 12 is an analog to digital converter, and this analog to digital converter is configured in the motor control circuit.

In step S110 and in step S120, the speed compensation module 12 receives a speed-compensation voltage from the set pin SET of the fan control circuit 1, and generates a speed-compensation parameter according to the speed-compensation voltage and a first waveform W1. A pulse width modulation signal is generated according to the intersection of the first waveform W1 and the speed-compensation voltage, and this pulse width modulation signal is a speed-compensation parameter W2. According to the speed-compensation parameter, the processing module 11 adjusts the control signal, which is transmitted to the driving module 13 for driving the fan 2. Although the speed-compensation voltage in FIG. 3 is predetermined, the first voltage VCC is variable as described above, so in other embodiments, the speed-compensation voltage can be variable. When the speed-compensation voltage is variable, the speed-compensation voltage can be adjusted (being increased or being decreased) according to the first voltage VCC. As a result, the speed-compensation parameter has different duty cycles. In this embodiment, the first waveform W1 is a triangle wave, but in other embodiments, the first waveform W1 can be other kinds of waves, such as a sawtooth wave.

To sum up, in the fan control circuit and the fan control method provided by the present disclosure, the input voltage is variable and the speed-compensation voltage is generated according to the input voltage. In this manner, the decrease of the rotation speed of the fan, resulted from the float input voltage, can be avoided, and thus the heat dissipating efficiency of the fan can be improved and the manufacturing cost can be reduced.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A fan control circuit, for controlling a fan, comprising:
a processing module;
a driving module, electrically connected to the processing module, generating at least one driving signal to drive the fan; and
a speed compensation module, electrically connected to the processing module and receiving a first voltage, wherein the first voltage is variable, the speed compensation module generates and transmits a speed-compensation parameter to the processing module according to the first voltage and a first waveform, and the processing module adjusts the driving signal according to the speed-compensation parameter such that the rotation speed of the fan is stable and remains constant, and being not adjusted by the variable first voltage;
wherein a voltage divider is defined at the exterior of the fan control circuit, the voltage divider receives the first voltage and generates a speed-compensation voltage, and the speed compensation module generates the speed-compensation parameter according to the speed-compensation voltage and the first waveform.

2. The fan control circuit according to claim 1, wherein the first voltage is provided by a system circuit.

3. The fan control circuit according to claim 1, wherein the first waveform is a triangle wave.

4. The fan control circuit according to claim 1, wherein a voltage divider receives the first voltage and generates a speed-compensation voltage, and the speed compensation module generates the speed-compensation parameter according to the speed-compensation voltage and the first waveform.

5. The fan control circuit according to claim 1, wherein the speed-compensation parameter is a pulse width modulation signal.

6. The fan control circuit according to claim 1, wherein the speed compensation module is an analog-to-digital converter, the analog-to-digital converter receives the first voltage and is electrically connected to the processing module to generate a digital speed-compensation parameter.

7. A fan control method, for compensating the rotation speed of a fan, comprising:
generating a speed-compensation voltage according to a first voltage, wherein the first voltage is variable;
generating a speed-compensation parameter according to the speed-compensation voltage and a first waveform; and
adjusting the rotation speed of the fan according to the speed-compensation parameter such that the rotation speed of the fan is stable and remains constant, and being not adjusted by the variable first voltage;
wherein a voltage divider is defined at the exterior of the fan control circuit, the voltage divider receives the first voltage and generates a speed-compensation voltage, and the speed compensation module generates the speed-compensation parameter according to the speed-compensation voltage and the first waveform.

8. The fan control method according to claim 7, wherein the first voltage is provided by a system circuit.

9. The fan control method according to claim 7, wherein the first waveform is a triangle wave.

10. The fan control method according to claim 7, wherein a voltage divider receives the first voltage and generates a speed-compensation voltage, and the speed compensation module generates the speed-compensation parameter according to the speed-compensation voltage and the first waveform.

11. The fan control method according to claim 7, wherein the speed-compensation parameter is a pulse width modulation signal.

12. The fan control method according to claim 7, wherein the speed compensation module is an analog-to-digital converter, the analog-to-digital converter receives the first voltage and is electrically connected to the processing module to generate a digital speed-compensation parameter.

* * * * *